(12) United States Patent
Nnaji

(10) Patent No.: US 10,135,970 B2
(45) Date of Patent: Nov. 20, 2018

(54) ACTIVE UNDETECTABLE MONITORING SYSTEM

(71) Applicant: Apham Nnaji, Lakeville, MN (US)

(72) Inventor: Apham Nnaji, Lakeville, MN (US)

( * ) Notice: Subject to any disclaimer, the term of this patent is extended or adjusted under 35 U.S.C. 154(b) by 834 days.

(21) Appl. No.: 14/258,777

(22) Filed: Apr. 22, 2014

(65) Prior Publication Data

US 2015/0304489 A1    Oct. 22, 2015

(51) Int. Cl.
*H04N 7/15* (2006.01)
*H04M 3/22* (2006.01)
*H04N 7/14* (2006.01)
*H04N 21/439* (2011.01)

(52) U.S. Cl.
CPC .......... *H04M 3/2281* (2013.01); *H04N 7/147* (2013.01); *H04N 21/4396* (2013.01)

(58) Field of Classification Search
CPC ....................................................... H04M 3/22
USPC ...................................................... 379/265.06
See application file for complete search history.

(56) References Cited

U.S. PATENT DOCUMENTS

| 7,606,909 B1 * | 10/2009 | Ely et al. ...................... 709/227 |
| 2008/0068447 A1 * | 3/2008 | Mattila et al. ............. 348/14.08 |
| 2013/0279499 A1 * | 10/2013 | Beacham ................. H04Q 3/00 370/352 |

* cited by examiner

*Primary Examiner* — Creighton Smith
(74) *Attorney, Agent, or Firm* — Michael A. Essien

(57) ABSTRACT

A system for the active silent and undetected monitoring of the video and audio communication session involving one or more video and audio participants may alternately engage, intervene or participate in the video/audio communication session. Such monitoring and engagement may include multiple and various locations with the monitoring participant having capacity to manage them from a first location.

13 Claims, 1 Drawing Sheet

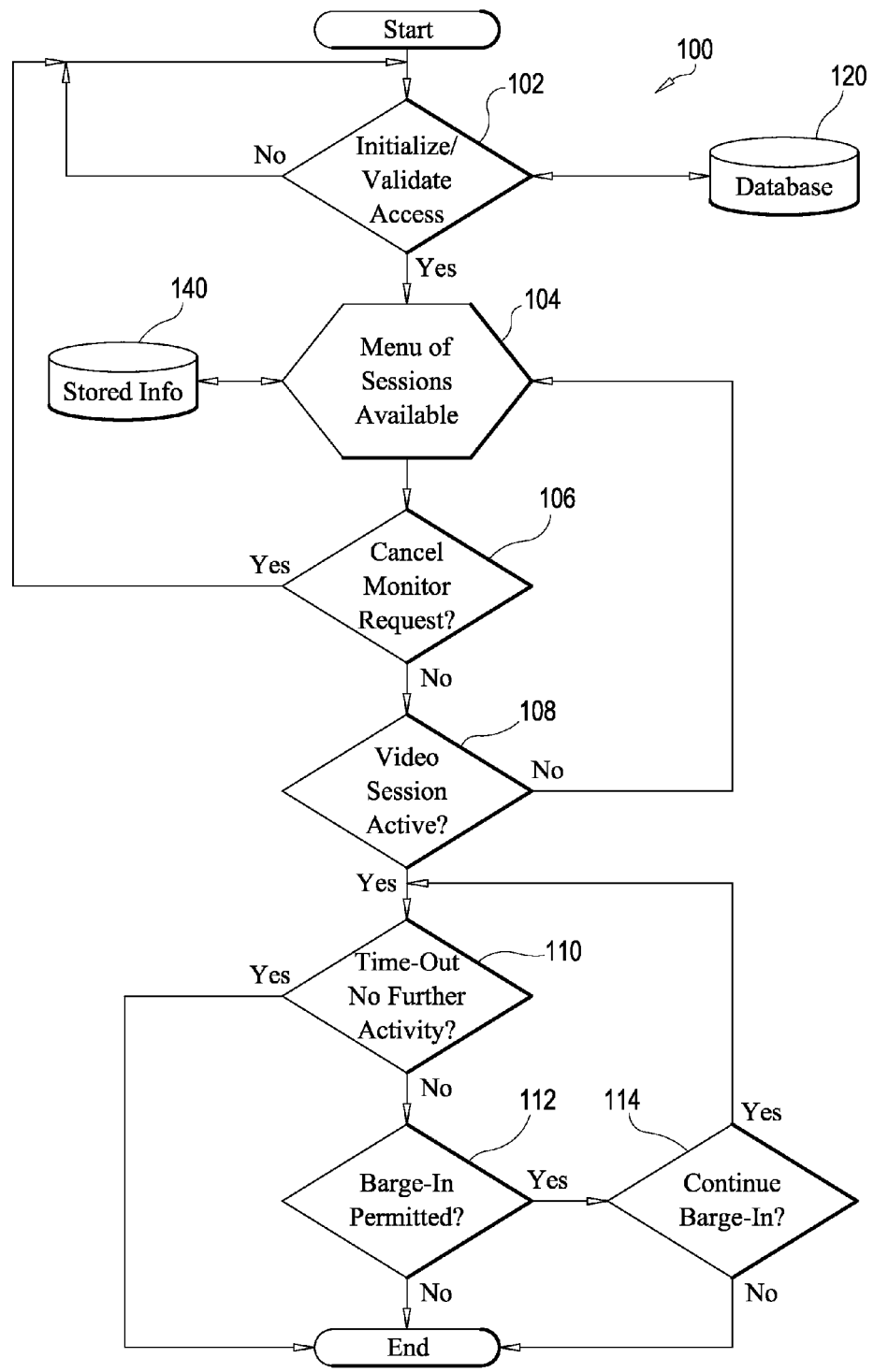

ACTIVE UNDETECTABLE MONITORING SYSTEM

BACKGROUND

Our busy society has presented us with several needs to ensure that work and other activities that may need observation, supervision, training and more, cannot be effected in person without large economic investments. As an example, previously, if a supervisor needs to be sure that an employee at a branch office is effecting the proper client interaction, duty, training, or module, that a supervisor or an agent of same would need to be physically present at the employee location to assure compliance or provide guidance to the employee. When the option changes from in-person monitoring or supervision at remote locations, the investment in economic and human capital is typically huge, thus precluding individuals and companies without the wherewithal from engagement of such technology. Other barriers to entry for this type of service make the use of this technology out of reach to a broader audience. In effect, the cost of this service implies that those that can offer such services, typically would transfer same to the customers, thus increasing the charge, and cost of doing business in bringing capacities to the reach of others who may not be economically or otherwise disposed to take advantage of it.

Silent surveillance monitoring of audio telephonic communications is a common capability and activity and the benefits of these activities are widely known. The undetected monitoring of video and audio sessions is not available as well as the benefits due for such service. As live video communication finds a more important role in contact centers, telemedicine, training, and other environments, the need for undetected monitoring of video and audio sessions for quality assurance and business applications continues to grow.

Recording of video and audio sessions is widely available, but lacks the immediate benefits of undetected monitoring in real time.

Remote counseling and assurance of compliance offer benefits in many ways to increase the level and quality of product offerings and performance of employees over a network.

From the above, it is notable that what is needed in the marketplace is a capability that provides the wherewithal to undetectably monitor video and audio communication sessions and activities, or actively participate in such actions, possibly from a remote location, for the benefit of the stakeholders. Such process and product to serve that need are included in this disclosure.

SUMMARY

In one embodiment, the present invention provides a method of active undetectable surveillance via a communication session initiated at a first endpoint and connecting with at least a communication session at a second or more endpoint wherein the surveillance is accomplished without the recognition or participation at a second endpoint. The active undetectable surveillance according to the present invention provides the initiator capacity to intervene in or engage with the party at the second endpoint.

In another embodiment of the present invention, the initiator of the active undetectable surveillance may initiate at least an additional surveillance session with another endpoint wherein the control of all aspects of the surveillance resides with the initiator.

The present invention also provides a method of active undetectable surveillance that includes first initiating the monitoring session at an endpoint of intended surveillance and initiating the supervisor or monitor after the object to be monitored is activated.

Another embodiment of the present invention includes the method of automatically initiating an active undetectable surveillance session based on a predefined set of criteria that may include words, action, time and date, duration, at least one or more participants, computer program codes or input, triggers, and information controlled from a predetermined input variable.

BRIEF DESCRIPTION OF THE DRAWING

This invention will be more readily understood from the following detailed description taken in conjunction with the accompanying drawing, in which:

The FIGURE illustrates an embodiment of the communication and activity path supporting an undetectable surveillance system of the present invention.

DETAILED DESCRIPTION

The FIGURE illustrates an embodiment of a communication and activity path supporting an undetectable surveillance system according to the present invention with a process diagram 100 wherein an action in surveillance starts when preferably initiated and access validated at 102. The validation step preferably accesses a database 120 of information pertaining to credentials and names of those with privileges to access such database of information. Such information may include other needed permissions, schedules and activities that pertain to such validation and credentialing to provide access to those with such need. With a valid access, a menu of sessions available for monitoring at 104 is preferably presented as appropriate to a monitor. Such information may preferably be stored as pertinent information at 140 for use by the monitor according to the present invention. A monitor with access can use this information to determine at least a scheduled video or communication session to monitor. At each stage in the process, information generated of collected may be retained in at least a database or information storage facility as appropriate.

In some instances, according to the present invention, a session selected for monitoring may be canceled for any suitable reason at 106, and in such instances, the monitor may restart the process according to the present invention. When the process is not cancelled at 106, an active video or communication session is preferably confirmed for monitoring or surveillance at 108. The active video session is preferably available and the monitor can see and hear the video session without being heard or seen or known by the session participants.

The monitoring session may continue or be timed out, wherein no further activity is ongoing at 110. If the session is still ongoing, an option is preferably provided for the monitor to engage openly by barging in on the session being monitored at 112. When a barge-in is permitted, the monitoring may continue in 114 or end. Each step provides access to continue the process of active undetectable monitoring according to the present invention as illustrated; with data collection as an allowable activity at each step in the flow of process according to the present invention.

In an embodiment of the present invention, a communication session which may be video, audio or combination thereof is preferably initialized at a first location or endpoint incorporating at least a participant. The communication session may preferably be initiated at a first location or endpoint and engaging at least an activity or receiver at a second location or endpoint. Preferably, the communication system of the present invention is actively but silently engaged, implying that the monitors are active in the process but such acts are silently effected. In most instances, the communication session may not be obvious or recognizable to the party at the second endpoint or the party or activity being monitored.

Each initialized communication session may preferably be presented via a computer, mobile device or other suitable devices that are usable for the purpose intended. It is also feasible to establish multiple communication sessions at either the first, second or multiple locations or endpoints of choice. The communication sessions of the present invention may take place between multiple endpoints simultaneously or may be directed at a particular first endpoint without other second or multiple locations depending on system demands and application to particular circumstances that may or may not be directed by the intent or purpose of such communication session. It is also feasible to alternate or initiate a session while another session is terminated or overlapping to attain a desired objective. Practically, one or more sessions may be initiated at a particular time and be expanded or reduced to add or drop the activities being monitored or under surveillance at a first, second or multiple endpoints.

The communication system of the present invention is preferably adaptable to optimally operate with and within the available technologies such as hard-wired systems that may link a first location or endpoint and a second or multiple locations or endpoints via communication devices now in use. The system of the present invention may preferably use wireless or other available non-hard-wired systems suitable to connect and provide for the communication necessary for effective silent active monitoring. It is reasonable to expect an application or module that may be internet web browser-based or via software installed on one or more computer systems. Other embodiments that are suitable to enable the desired undetectable monitoring objective may be incorporated as technology and accessibility enhancements occur.

As an example of the implementation of the active silent undetectable monitoring according to the present invention, a supervisor or monitor at a first location preferably initiates a session utilizing any of the available processes and necessary security credentials. Such credentialing may be useful to avoid or prevent undue tampering or accessibility to protected information by unauthorized personnel. Such unique credentials suitable to identify the initiator of such communication activity may include password protected information, encrypted data or other identifying and proprietary information or combinations thereof. The system of the first location may preferably provide access to one or more databases wherein information suitable to identify, provide credentials, give access and permissions, link to individual names, topics, schedules, other desirable attributes or combinations thereof. When access to the system of the present invention is provided to the supervisor or monitor at a first location, such access may link to communication sessions currently active or provide opportunities to new access at a second location that may need to be actively silently and undetectably monitored from the first location or endpoint. The monitor or supervisor at the first location may preferably peruse the lists of currently active or available communication sessions at the second endpoint or multiple endpoints.

According to the present invention, the object or activity monitored at any endpoint, shall include identifying information that may otherwise provide information on who or what is monitoring or being monitored. Such information may be protected from one or more parties at one or the other endpoint. In most instances, the monitor reserves the capacity to keep the person or activities being monitored unaware of such actions. The present invention may provide capacity to manage the authorizations and permissions to access or actively and undetectably monitor one or more activities according to responsibilities charged to the monitor or supervisor. In some cases, active silent monitoring or communication between two endpoints may involve law enforcement and legal implications associated therewith.

The undetectable and active monitoring communication system of the present invention may provide capacity to monitor on a delayed basis, an activity that may have taken place at an earlier time. Such monitoring may record activities that occurred at a second endpoint and provide such recorded activity for later review from a first location as deemed appropriate. In such instances, it is preferable to provide a remote activator or initiator that triggers and activates a recording device suitable to record interested activities for later evaluation from the first location. Such delayed action may not provide for active monitoring but presents undetectable post activity surveillance.

The active monitoring or communication system of the present invention may preferably provide capacity to monitor communication sessions that are yet to take place, creating a scheduling process to incorporate a monitoring session for a supervisor at a first location to actively monitor an activity or person at a second location. When and if the activity or session at a second location is due to be engaged, such system may provide a process wherein the supervisor or monitor at a first location may be alerted to engage as preferred. Future planned active monitoring sessions may be activated when the monitor or supervisor at a first location is alerted and actively participates or silently monitors the activities at a second or other location.

The undetectable monitoring session according to the present invention may be triggered or activated by a set of activities, words, document, conditions or combinations thereof. As an example, if the need for surveillance or monitoring is conditioned on some conditions, such conditions may be incorporated into the system of the present invention and when such conditions are present at the second or multiple endpoint, a monitoring session automatically ensues. The party or supervisor at the first endpoint may consequentially be alerted or otherwise incorporated into the surveillance activity.

In an embodiment of the present invention, a typical session provides information on the participant, status, eligibility for monitoring, active monitoring, scheduling, and other pertinent attributes as needed for the communication session. Use of attributes to indicate status or description of the monitoring session is feasible according to the present invention. Such attributes may include text, color, icons, and the like as appropriate.

In another embodiment of the present invention, when a session is active and a participant is being silently and actively monitored, at least one monitor or supervisor at a time may be able to interact with a second location endpoint. This interaction may include actual communication, whether silent or not, with a party at a second location. The party or person being monitored may not preferably interact with anyone, nor be aware that there is a monitoring activity going on at that time.

According to an embodiment of the present invention, at the initialization of a communication session between the first and second location, participants in an ongoing video or audio session who are not the subject or object of the communication session may not preferably be engaged in the session. As an example, it is feasible to expect a monitored party at a second location teaching a class, executing a module or otherwise engaging a group of people, even if on video, without the knowledge or indication to the group that the party is being monitored. The active silent monitoring of activities or parties according to the present invention may preferably be accomplished between the parties and location under such communication without the engagement of other parties or activities. It is preferably an object of the present invention to communicate or monitor an object, person or activity in a process that is particular to the parties being monitored without the interaction or engagement of other parties. In instances where bystanders or non-interested parties are preferred or expected in the interaction, the present invention may be adapted to expand the scope to incorporate same via purposeful inclusion in the monitoring process. Such purposeful inclusion may preferably be accomplished by linking communication devices to the group of participants in the communication activity.

The monitor or supervisor at a first location may engage one or more sessions concurrently. In a preferred embodiment, the supervisor at a first location may be linked in a manner adaptable to available technology suitable to provide multiple access points at the first location linking up to the one or more access endpoints at a second location or multiples of other locations. The communication session at each location is preferably not merged or interlaced with each other, except that the supervisor or monitor at a first location suitably has the capacity to monitor the various locations as desired according to the present invention. Each monitor may actively and silently control the communication session from the first location.

The present invention provides for the supervisor or monitor at a first location to interactively engage in a module or activity that is being monitored at a second location or multiples thereof. If needed, the monitor or supervisor may preferably intervene in the communication session by interrupting the ongoing session, either via a "barge-in" on the session, thus becoming a participant as well as a monitor. When and if the supervisor "barges-in," the supervisor may interact with the party being monitored. The "barge-in" process is preferably at the discretion of the monitor or supervisor who has the privilege and capacity to exit and return to the active undetectable silent monitoring format at any time. The supervisor or monitor, in accordance with an embodiment of the present invention may terminate an initialized session as and when deemed appropriate or when the time allocated to such session has expired.

In an embodiment of the present invention, the active silent monitoring process may preferably be programmed for a predetermined period and time wherein the engagement between the monitor at a first location may suitably monitor or engage the party or activity at a second location. Control or time allocated to the monitoring process may be set for a preplanned time or managed according to the needed reason or cause for such monitoring. If a preset period is utilized for the monitoring process or communication session, such session will preferably terminate at the expiration of the allocated time unless intervened to extend or limit same.

The active silent monitoring process may include use of Short Message Service (SMS), Skype® messaging, Twitter®, Vidyo® or other such messaging modes as available and adaptable to the system of the present invention. Adequate security protocols may be incorporated to provide secure communication between the parties and location according to the present invention.

A reporting system may preferably be customized to provide details of the activities associated with an embodiment of the present invention. Such details may include, but are not limited to: supervisor logs, entry and exit, barge-ins, time and location and other pertinent information as needed. Other opportunities from the present invention include the facilitation, data collection, recording, monitoring, storing or combination thereof to provide an effective communication or active monitoring. In a preferred setting, the service initiation is established by a supervisor or someone charged with similar responsibilities to actively and silently monitor at least an activity occurring at a second endpoint.

Activation of the communication session at a first location provides an active link with the second location according to the present invention. This activation may include testing out a second location for compatibility or readiness and availability of equipment adapted for said monitoring communication. Equipment useful at a first location includes at least a camera, television monitor, microphones, computer or similar devices, electrical switches and any device useful to effect a monitoring service at a first location according to the present invention.

When the monitoring activity does not need to be undetectable and both endpoints are aware of such monitoring activity, a session may preferably be initiated at a second location to be monitored when such session is planned or there is an activity or module that warrants monitoring from a first location. According to the present invention, the party at the first endpoint and the second endpoint to be monitored may initiate the equipment at the second location by establishing a link with the first location. This establishment may include using equipment adaptable for the process of monitoring to ensure that appropriate communication is practical and possible between the locations. Such appropriate communication may include use of camera, television or computer monitors, microphones, computer equipment or such other devices adaptable to provide effective linkage between the first and second location. This process may repeat for multiple locations when the monitoring session involves more than one monitored location.

When a session according to the present invention ends, either due to communication issues or is timed-out, such decision point provides for verification if such disruption is purposeful. If the disruption is not purposeful, the system may be restarted or reconnected to continue the communication session. When the session is purposefully ended, the supervisor may then terminate the active session and complete same.

Having thus described the preferred embodiments of the present invention, those of skill in the art will readily appreciate that the teachings found herein may be applied to yet other embodiments.

What is claimed is:
1. A method of actively monitoring activities, comprising establishing at least an intervention condition for initiating an undetectable monitoring system;
    initiating a video communication session at a first endpoint;
    initiating an undetectable video communication session at a second endpoint; and connecting the video communication sessions of the first endpoint with the second endpoint without recognition by a party at the second endpoint;
wherein the communication session at the first endpoint is intervened by a monitor at the first endpoint by messages, including short message service, beeps, or direct communication.

2. The method of claim 1, wherein the video communication session is active without regard to location.

3. The method of claim 1, wherein the intervention is executed by messages including short message service, beeps, direct communication or combinations thereof.

4. The method of claim 1, wherein the monitoring session is controlled by the monitor at the first endpoint.

5. The method of claim 1, wherein the monitoring session is only in audio mode.

6. The method of claim 1, wherein the communication session is activated based on a predefined set of criteria including words, action, time and date, duration, movements, or combinations thereof.

7. The method of claim 1, wherein the communication session is accomplished via computer, mobile device, camera, or web browser.

8. The method of claim 1, wherein the communication session is initiated and controlled via web applications.

9. The method of claim 1, wherein the communication session is initiated at a second endpoint.

10. The method of claim 1, wherein the communication session includes multiple endpoints linked to the first endpoint.

11. The method of claim 1, wherein the communication session is accomplished by hard-wired systems.

12. The method of claim 1, wherein the communication session is recordable.

13. The method of claim 1, wherein the communication session is initiated by the monitor first before initiating the second or more endpoints.

* * * * *